March 27, 1928.  1,664,305
H. C. McCLEARY
SUPPORTING UNIT FOR VEHICLES
Filed April 23, 1926   6 Sheets-Sheet 1

Inventor
H. C. McCleary
By 
Attorneys

March 27, 1928. 1,664,305

H. C. McCLEARY

SUPPORTING UNIT FOR VEHICLES

Filed April 23, 1926 6 Sheets-Sheet 3

Inventor
H.C.McCleary

By Robb, Robb & Hill
Attorneys.

Patented Mar. 27, 1928.

1,664,305

UNITED STATES PATENT OFFICE.

HARRY C. McCLEARY, OF WASHINGTON, DISTRICT OF COLUMBIA.

SUPPORTING UNIT FOR VEHICLES.

Application filed April 23, 1926. Serial No. 104,156.

This invention relates to a supporting unit for vehicles, and particularly to a construction adapted to embody in a spring suspension independent driving means for the several wheels thereof.

In the art of spring suspension it has been difficult to secure satisfactory results in driving the wheels through the suspending medium by an interposed differential, and it is found particularly desirable to embody a separate driving motor with the suspending unit for each of the wheels.

In the previous types of spring suspension the springs have been disposed at substantially the mid length of the connectors or extending for the continued length thereof. It has been found, however, that by moving the point of spring suspension for the connectors to the greatest distance from their inner pivots the length of leverage is increased and greater efficiency secured as the spring being disposed directly at the wheel will absorb the normal vibrations thereof without even transmitting it to the connectors. This arrangement of the spring permits its rigid support upon the vehicle frame and its direct assemblage with the connectors by means of spring carriers mounted thereon.

It has also been found in previous driving connections of this general character that it was difficult to remove the separate members thereof and I have provided means by which the drive shaft members may be readily removed from their bearings and replaced therein whenever desired.

The invention has for an object to provide a novel and improved construction wherein the frame carrying the vehicle body is provided with a spring support directly adjacent the wheels and adapted to operate in opposite directions of movement thereof.

A further object of the invention is to provide an improved construction of supporting casing for the spring members and pivoted connectors, the latter being mounted upon a common pivot at substantially the transverse center of the vehicle and extended outward for connection with the wheel supports at which point the connectors are provided with spring carriers embracing springs having their support upon the main frame of the vehicle.

Another object of the invention is to provide an improved construction of the spring suspension member embodying a base extended from the relatively fixed main frame of the vehicle and having springs disposed at opposite sides thereof, together with upper and lower connectors each formed with a spring carrier adapted to embrace the end of the spring removed from the frame base, together with means for adjusting and regulating the tension of such springs.

The invention also has for an object to provide a construction of casing extending transversely between the machine frame members and provided with means for detachably supporting the members of a universal driving connection so that either or both of said members may be removed as found desirable.

Other and further objects and advantages of the invention will be hereinafter set forth and the novel features thereof defined by the appended claims.

In the drawings:—

Figure 3 is a detail cross section of the spring suspension unit;

Figure 6 is a vertical section through the wheel assembly; and

Like reference numerals designate corresponding parts throughout the several figures of the drawing.

Figure 1:
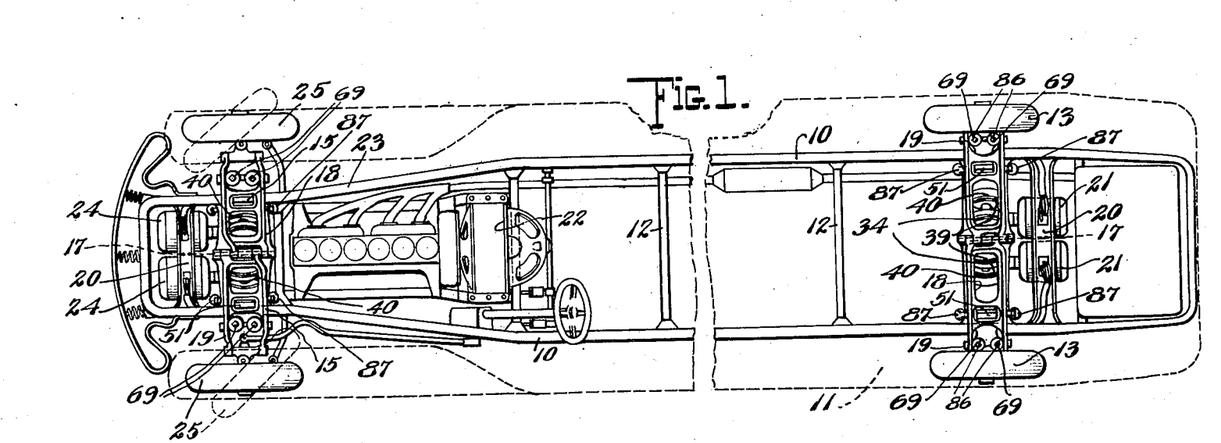
Figure 1 is a plan of the machine frame, the body being indicated in dotted lines.
Figure 2:
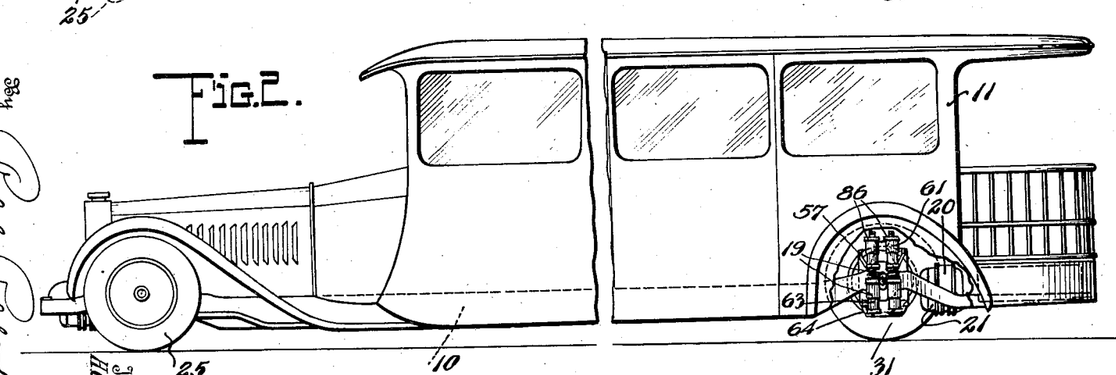
Figure 2 is a side elevation thereof with parts broken away.

While the invention is applicable to many types of vehicles, it is for the purpose of illustration herein shown in Figures 1 and 2 as comprising a main frame 10 adapted to support a body 11 in the usual manner and is provided with the usual cross braces 12. The frame is supported from the wheels 13 through the wheel support 14 and the upper connector 15 and lower connector 16 which are extended to a central pivotal connection 17 upon an inverted U-shaped casing 18 carried by the main frame 10, this suspension being effected by means of an interposed spring unit 19, as will be more fully hereinafter described.

In this assemblage the frame is provided with a supporting member 20 to receive the driving motors 21 for the separate wheels, such motors being preferably of an electric character and actuated by a generator 22 connected to the usual motor 23 of explosive type. The motors 24 for the front wheels 25 are similarly mounted at the front of the machine. Since the suspension units at the front and rear of the machine are substantially identical in character, only the latter will be specifically described.

The supporting casing 26 disposed at the longitudinal center of the vehicle comprises a body of substantially diamond shape with a central web 27 and lateral connectors 28 which support the bearings 29 for the inner section 30 of the transmission shaft. This shaft is formed at its inner end with a reduced portion 31 suitably seated in bushings in the bearings 29 and these bearings further carry a portion 32 of the enclosing casing for the worm gear 33 secured upon the shaft 30. The outer section 34 of this casing is intended to be removable as well as the enclosing casing 35 at the base thereof in which the driving worm 36 from the motor is disposed. This worm has proper bearings 37 for its outer ends.

From the parts so far described it will be obvious that if the casings 34 and 35 are removed the section 30 of the transmission shaft and parts carried thereby may be withdrawn, particularly after the outer section is likewise withdrawn. The body of the casing 26 provides for the pivotal mounting of the connectors 15 and 16 in the same vertical plane and at a central point so that the tendency to a side thrust or movement through the end play of the connector is eliminated.

The outer end of the shaft section 30 is supported in a bearing plate 38 carried by the members 18 of the frame and may also be provided with a brake drum 39 and cooperating shoe 40 as shown in Figure 3. The end of the shaft terminates in a universal joint 41 which in the present instance comprises a ball member embraced by the cup 42 having a sleeve 43 slidingly mounted upon the angular end 44 of the outer transmitting shaft 45. The outer end of the shaft 45 is formed with a universal joint 46 which is connected to the stub shaft 47 for driving the wheel, as shown in Figure 6. This shaft extends through the usual wheel support 48 which is provided at diametrically opposite points with pivoting lugs 49 adapted to receive the ends of the connectors 15 and 16.

Figure 4:
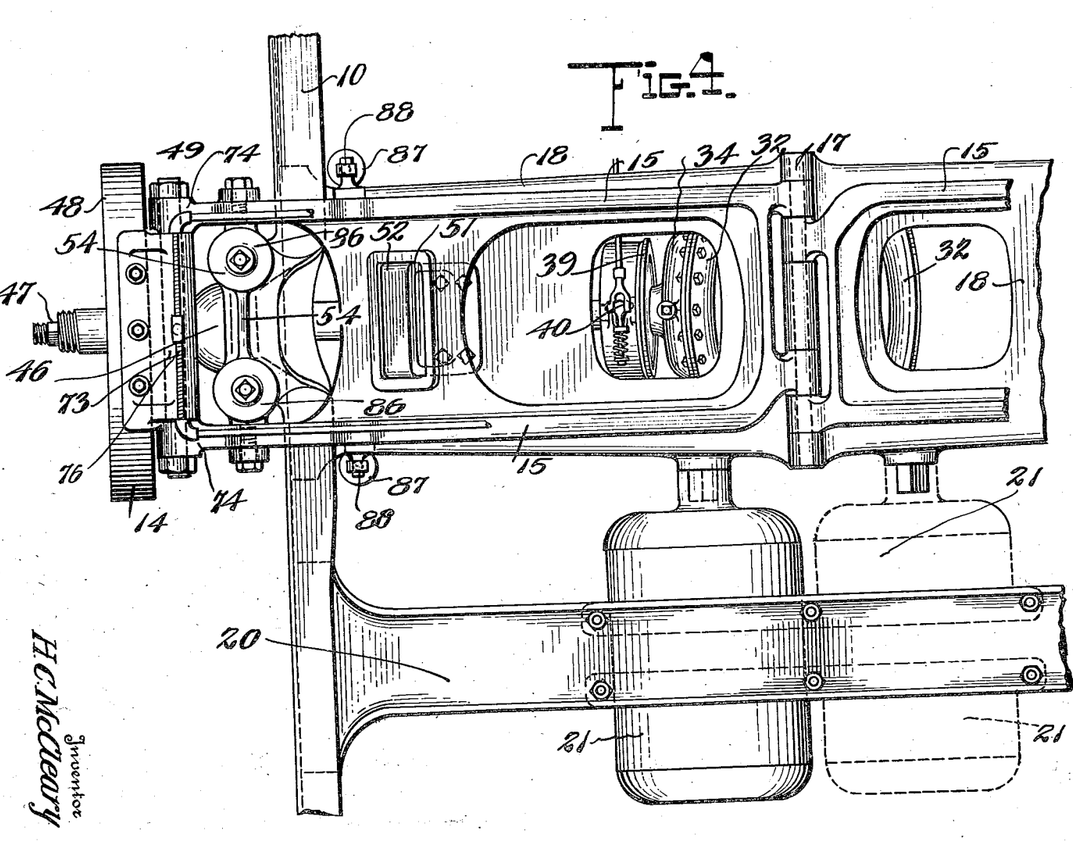
Figure 4 is a top plan thereof.

As shown in Figure 4, these connectors are of more or less plate form and have suitable open spaces for access to parts within the casing and also for projecting members therefrom.

The construction just described provides for the removal of the wheel with the outer section of the transmission shaft by merely withdrawing the pivotal connections at 49. The sliding joint formed by the members 43 and 44 is preferably enclosed within a shoe 50 to protect the same against dirt or injury. The frame members are also formed adjacent their outer ends with curved guide lugs 51 extending in opposite directions and passing through apertures 52 formed in the connectors 15 and 16 respectively, as shown in Figures 3 and 4. This prevents any accidental movement in other than a vertical plane of the connecting members relative to the frame.

Figure 5:
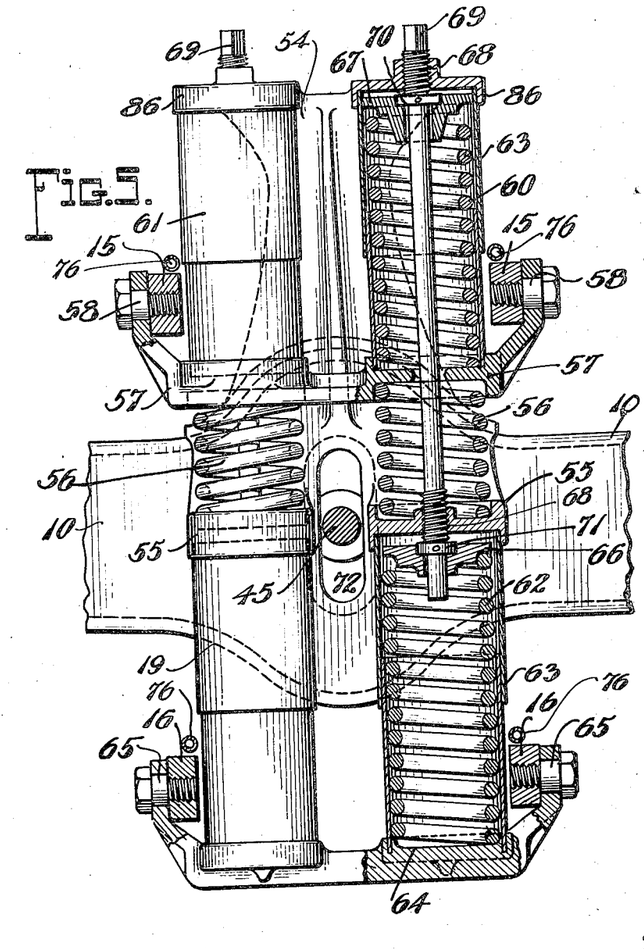
Figure 5 is a detail elevation, with parts in section, of the spring support.

While the casing 18 may be applied to the main frame 10 in any desired manner, it is shown in Figure 3 with its outer end 53 bolted thereto, one of which bolts may also secure the upward and laterally extending standard 54 which carries the bearing cap 86. The main frame 10 also has secured thereto an outwardly extending spring base 55 as shown in Figures 3 and 5.

Mounted upon this base is a coil spring 56 which supports at its upper end the spring plate 57 carried by the upper connector 15. This plate is pivotally mounted upon the connector at 58 to accommodate its free movement. Above the spring 57 is a spring 60 which is suitably enclosed by a telescoping casing 61 supported by the plate 57 and by the carrier 54 from the frame. Beneath the spring support 55 from the frame a spring 62 is disposed and enclosed within a telescoping casing 63, the lower end of this spring being seated against the spring plate 64 pivotally connected at 65 to the lower connecting member 16, so that both of the connectors are controlled in unison in the downward or compressive movement of the springs.

It has also been found desirable to adjust the tension of these springs to take up any sag which may occur during continued use, and for that purpose I have provided a follower 66 bearing upon the upper end of the lower spring 62 and a corresponding follower 67 bearing upon the spring 60, these followers being adapted for adjustment axially of the spring by means of the threaded upper portion 68 of the shaft rod 69 which has the followers. As shown at 70, the connection of the follower 67 with the rod is by means of a freely rotatable disk 70 and a similar connection 71 is made with the follower 66, the latter being capable of longitudinal adjustment upon the rod in case it is desired to vary the relative distance of the followers.

In the illustration of this spring mounting, parallel springs are shown but it will be obvious that the number and arrangement thereof may be altered at will. The parallel arrangement, however, is found particularly desirable since it supplies the yielding support directly at the points of connection of the pivoted connectors. In the arrangement of the springs as shown in Figure 5 the section 45 of the transmission shaft extends between the springs, and the frame is provided with a suitable elongated opening 72 to permit free movement of the parts at this point.

Figure 7:
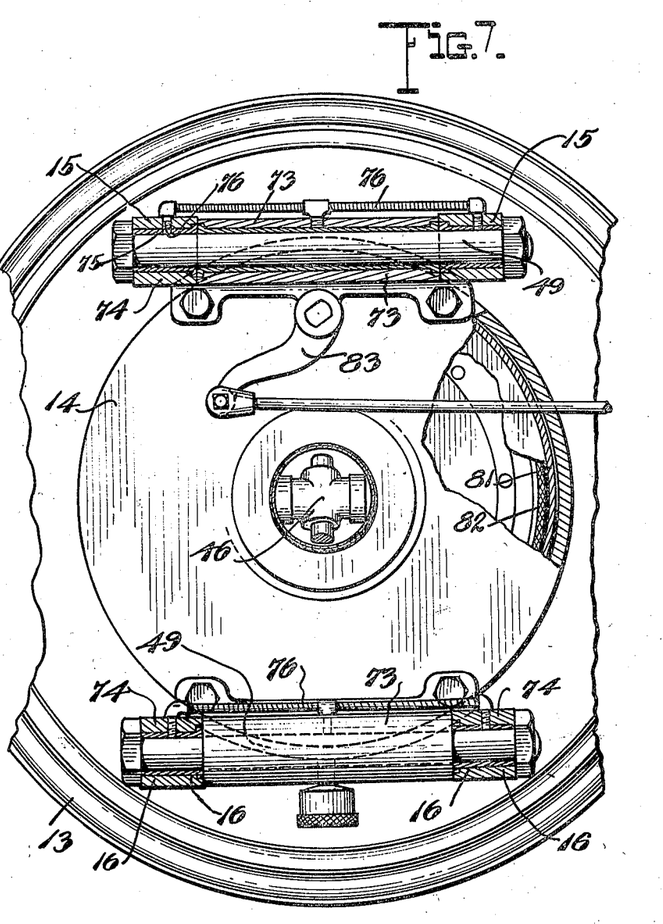
Figure 7 is a rear elevation thereof with parts in section.

In order to provide a wide bearing at the wheel support and permit the most convenient removal of the pivot in disassembling the parts, it has been found desirable to form an elongated bearing box 73 on the wheel support to receive the pivot bolt 49 which passes through the separated end sections 74 of the connectors, as more specifically shown in Figures 4 and 7. In this connection a suitable bushing 75 may be used in this bearing and suitable lubricating connections as shown at 76 provided to reduce friction therein.

The wheel support 48 is formed with a central bearing portion 77 through which the stub shaft 47 passes, this shaft being provided at its outer end with a squared portion 78 of the usual character by which the rotatable wheel body 79 is driven. This body also carries a bearing 80 which rides upon the bearing portion 77 in the rotation of the wheel, the details thereof not being essential to the present invention. The wheel body is also provided with a brake member 81 and cooperating shoe 82 having a connector 83 extending through the wheel support 48 for operation at a suitable point. The wheel is retained in position by the usual nuts 84 and 85 and if it be desired to remove the wheel this nut and the retaining nuts 85 may be removed and the entire rotatable section withdrawn from the wheel support and members carried thereby.

If desired a recoil check may be applied between the connectors and frame, for instance as shown in Figure 3 where the cylinder 87 is secured to the frame and the piston rod therefrom pivotally attached at 88 to the connector.

From the foregoing description the general operation of this invention will be apparent, and it will be seen that the normal pressure upon the chassis is applied to the springs 60 and 62 through the connecting members 54 and 71 from the frame which move in unison and against the spring carriers of the two connectors which support the lower ends of the springs mentioned. It is also desirable to provide a recoil spring at 56 intermediate the fixed support 55 from the frame and the spring carrier of the upper connector. By this arrangement of the springs and their disposition immediately adjacent the wheel support the most efficient supporting action is secured with the maximum resiliency and minimum tendency to vibration and rebound as the springs are disposed at the greatest possible distance from the inner pivots of the connector, thus forming a long leverage.

It has also been found desirable to connect the upper and lower spring supports from the frame by a rod member which performs a further function of tensioning the compression springs by means of the adjustable followers controlled by the rod.

The construction of supporting casing shown is particularly adapted for use with independent driving units for the wheels and provides for the elimination of the usual differential and the ready removability of the driving units as found desirable. This is facilitated by the inverted U-shaped construction having the triangular body carrying the bearings for the transmission shafts and a fixed portion of the casings therefor.

While the specific details of construction have been shown and described, the invention is not confined thereto as changes and alterations may be made therein without departing from the spirit thereof as defined by the appended claims.

Having thus described my invention, what I claim as new and desire to secure by Letters Patent is:

1. In a spring suspension, a chassis frame, a casing supported thereon, opposite wheel supports, parallel connectors extending from the casing to said supports, coiled supporting springs carried by the frame at a point intermediate the casing and wheel support and acting on means upon said connectors adjacent the wheel support, a spring carrier mounted upon the frame and extended above the upper connector, and a recoil spring mounted therein to bear upon the connector.

2. In a spring suspension, a chassis frame, a casing supported thereon, opposite wheel supports, parallel connectors extending from the casing to said supports, coiled supporting springs carried by the frame at a point intermediate the casing and wheel support and acting on means upon said connectors adjacent the wheel support, a drive shaft bearing provided at the center of the casing, and means for supporting the outer end of said shaft for vertical movement within a slotted portion of the frame.

3. In a spring suspension, a frame comprising parallel side members, a transverse casing secured at each end to said members, opposite wheel supports, parallel connectors pivoted to the casing at their inner ends and to the wheel supports at their outer ends, and springs supported by the side members intermediate the casing and wheel supports and acting on means upon each of the connectors adjacent their pivot at the wheel support.

4. In a spring suspension, a frame comprising parallel side members, a transverse casing secured at each end to said members, opposite wheel supports, parallel connectors pivoted to the casing at their inner ends and to the wheel supports at their outer ends, a fixed spring support extended laterally from the side members intermediate the casing and wheel supports, pivoted spring carriers mounted upon each of the connectors at their outer ends, and springs disposed between said carriers and fixed support.

5. In a spring suspension, a frame comprising parallel side members, a transverse casing secured at each end to said members, opposite wheel supports, connectors pivoted to the casing at their inner ends and to the wheel supports at their outer ends, a fixed spring support extended laterally from the side members intermediate the casing and wheel supports, pivoted spring carriers mounted upon each of the connectors at their outer ends, springs disposed between said carriers and fixed support, a spring casing supported from the side members above the upper spring carrier, and a recoil spring disposed therein to bear upon said carrier.

6. In a spring suspension, a frame comprising parallel side members, a transverse casing secured at each end to said members, opposite wheel supports, connectors pivoted to the casing at their inner ends and to the wheel supports at their outer ends, a fixed spring support extended laterally from the outer face of the side members, pivoted spring carriers mounted upon each of the connectors at their outer ends, springs disposed between said carriers and fixed support, a spring casing supported from the frame side members above the upper spring carrier, a recoil spring disposed therein to bear upon said carrier, and means for jointly adjusting the tension of said recoil spring and the spring beneath the fixed support from the frame and comprising a threaded rod having freely mounted carriers thereon bearing upon said springs.

7. In a spring suspension, opposite frame members, a casing provided with a central body portion and secured at its opposite ends to said members, bearing casings carried by said body portion, independent drive shafts each having gear members disposed in said casings, separate motors for actuating said gear members, opposite wheel supports, parallel connectors pivoted upon the body of the casing and at their outer ends to said wheel supports, and a spring support carried by the frame and acting on means upon each of the parallel connectors.

8. In a spring suspension, opposite frame members, a casing provided with a central body portion and secured at its opposite ends to said members, separable bearing casings carried by said body portion, a drive shaft having a gear member disposed in said casings, opposite wheel supports, parallel connectors pivoted in a common vertical plane upon the body of the casing and at their outer ends to said wheel supports, a spring support carried by the frame and having bearing contact with the parallel connectors, and a guide member mounted upon the casing and extended through a cooperating aperture in the movable connector.

9. In a spring suspension, the combination with opposite frame members, of a transverse casing rigidly connected at each end thereto, a lateral spring support extended outward from said frame, opposite wheel supports, upper and lower connectors pivoted to the casing and to said wheel supports, spring carriers pivoted upon said connectors intermediate the casing and adjacent the wheel support pivot, a spring disposed between the frame support and the carrier of the upper connector, a spring casing supported by the frame and extending above the spring support and said upper connector, a spring disposed between the spring carrier upon the upper connector and said spring casing, and a coiled spring disposed beneath the fixed frame support and supported by the spring carrier of the lower connector.

10. In a spring suspension, opposite frame members each having a fixed spring support, a transverse casing connecting said members, upper and lower connectors pivoted at their inner ends to said casing, wheel supports pivoted at the outer ends to said connectors, spring carriers mounted upon each of the connectors, a fixed spring support extended from the frame above the upper connector, a spring extending therefrom to the upper face of said connector, a spring disposed between the lower face of said connector and the fixed support upon the frame, a spring disposed between the lower face of the frame support and the carrier of the lower connector, and telescoping casings surrounding said springs for protective purposes.

11. In a spring suspension, opposite frame members, an inverted U-shaped casing connecting the same, wheel supports, connectors pivoted to the casing and said supports, spring means extending between the frame and said connectors for yieldingly supporting the same, a central body for said casing provided at opposite sides with open bearings, transmission shafts mounted in said bearings and provided with a gear member, driving shafts for said gear members pivoted in the depending sides of said casing, a support carried by the frame, independent motors mounted thereon and connected to said driving shaft, and a connection from the transmission shaft to a wheel embodying a universal joint.

12. In a spring suspension, a frame member having spring supports disposed in different horizontal planes, a wheel support, a casing, parallel connectors extending from said wheel support to the casing, spring carriers upon each of said connectors disposed beneath and aligned with the spring supports of the frame, and coiled springs disposed between said carriers and supports to jointly control the parallel connectors.

13. In a spring suspension, a frame member having laterally extended spring supports disposed in different horizontal planes, a wheel support, a casing, parallel connectors extending from said wheel support to the casing, spring carriers upon each of said connectors disposed beneath and aligned with the spring supports of the frame, coiled springs disposed between said carriers and supports to jointly control the parallel connectors, and a connecting member extending between the spring supports from the frame and supporting a contact member for each spring.

14. In a spring suspension, a frame member having laterally extended spring supports disposed in different horizontal planes, a wheel support, a casing, parallel connectors extending from said wheel support to the casing, spring cariers upon each of said connectors disposed beneath and aligned with the spring supports of the frame, coiled springs disposed between said carriers and supports to jointly control the parallel connectors, reciprocating followers disposed in contact with said springs, and a threaded connector between the supports from the frame and threaded therein to adjust said followers in unison.

15. In a spring suspension, a frame member having laterally extended spring supports disposed in different horizontal planes, a wheel support, a casing, parallel connectors extending from said wheel support to the casing, spring carriers upon each of said connectors disposed beneath and aligned with the spring supports of the frame, coiled springs disposed between said carriers and supports to jointly control the parallel connectors, reciprocating followers disposed in contact with said springs, a threaded connector between the supports from the frame and threaded therein to adjust said followers in unison, and a recoil spring disposed beneath the upper connector and one of the frame spring supports.

16. In a spring suspension, opposite frame members, a casing secured at its opposite ends thereto and provided with a central bearing portion having a gear casing at its outer face, a transmission shaft section mounted in said bearing portion and having a driving gear within said casing, a wheel support, a shaft section carried by said support and having a telescoping connection with the first mentioned section, pivoted connectors extending from the wheel support to the casing, a drive shaft carried by said gear casing and geared directly to the driving gear, and a motor adjacent said casing and independently connected to said drive shaft.

In testimony whereof I affix my signature.

HARRY C. McCLEARY.